Nov. 25, 1952 — G. W. GRAY — 2,618,965
SURFACE FINISH GAUGING DEVICE
Filed Oct. 24, 1947
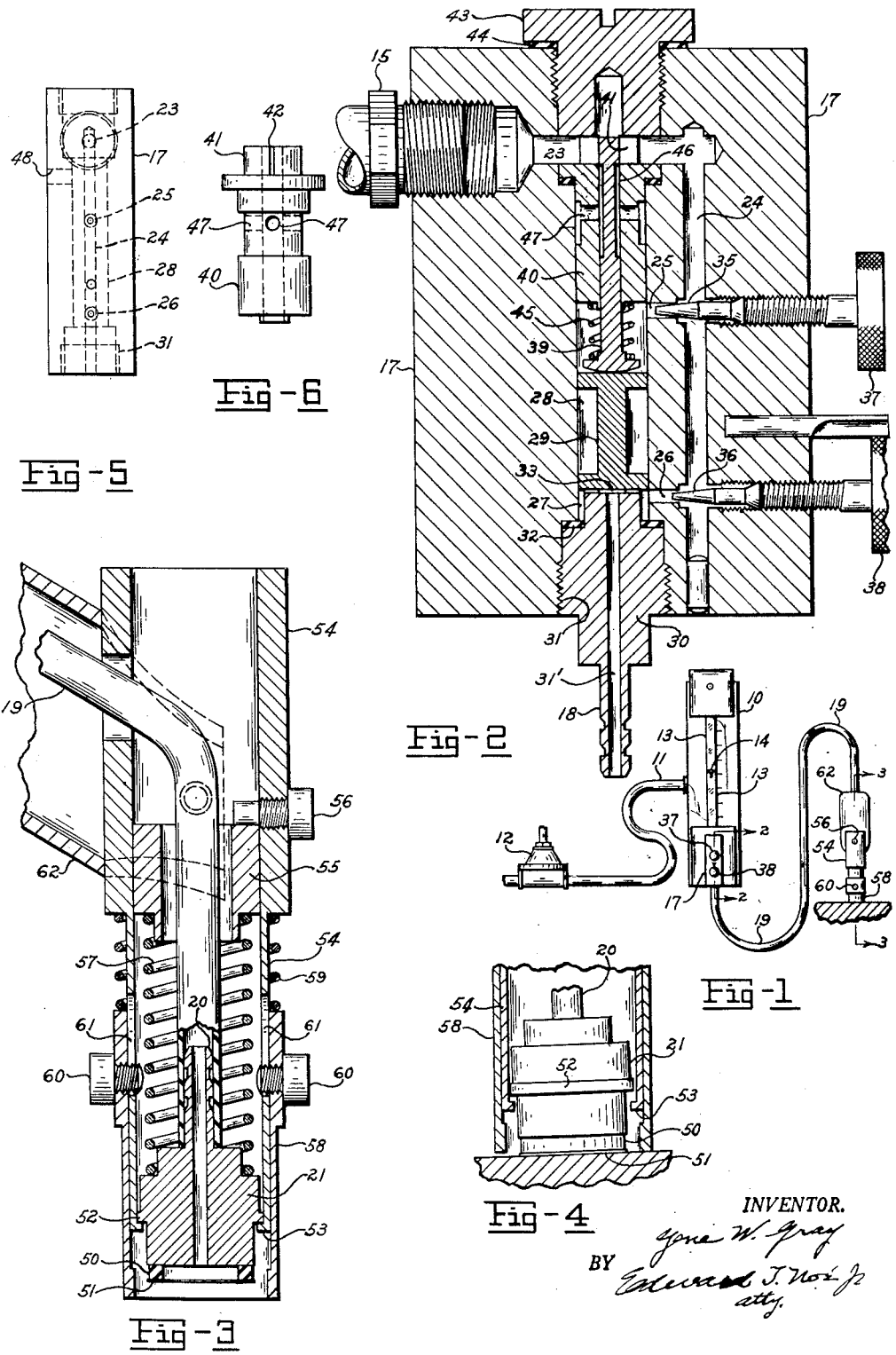
INVENTOR.
Gene W. Gray
BY Edward J. Noé Jr.
atty.

Patented Nov. 25, 1952

2,618,965

UNITED STATES PATENT OFFICE 2,618,965

SURFACE FINISH GAUGING DEVICE

Gene W. Gray, North Hills, Pa.

Application October 24, 1947, Serial No. 781,801

12 Claims. (Cl. 73—37)

This invention relates to gauging devices and more particularly to gauging devices operated or controlled by means of a flow of air or other fluid.

One object of the invention is the provision of a gauging device for gauging surface finish in which variations in fluid flow between the surface to be gauged and a smooth work gauging surface are employed for measuring surface finish, yielding means being interposed between the gauging surface and the work head that carries the gauging surface so that the general contour or curvature of the surface gauged will be accommodated by the gauging surface.

Another object is the provision of a gauging device of the character mentioned, in which the gauging surface may be applied with a predetermined pressure to the surface to be gauged.

Another object is the provision of a gauging device for checking surface finish, having a protecting sleeve that normally protects the gauging surface.

Another object is the provision of a flow gauging means having an automatically operable valve movable in accordance with changes in pressure for amplifying operation of the flow gauging means.

Another object is the provision of a gauging device adapted for connection to a source of fluid pressure and embodying a flow gauging means having a member responsive to fluid flow and a pressure chamber having a discharge opening, a relief valve, and a valve automatically operable in accordance with the pressure in the pressure chamber for controlling the flow of fluid from the gauging means to the relief passage and so arranged that very small changes in fluid flow from the pressure chamer to a suitable gauging orifice greatly amplify the changes in fluid flow that take place through the flow gauging means.

Other objects and advantages of the invention will be apparent from the following description, the appended claims, and the accompanying drawing, in which Fig. 1 is a front elevation of a gauging device embodying the present invention;

Fig. 2 is a vertical section of the amplifying valve, taken on the line 2—2 of Fig. 1;

Fig. 3 is a vertical sectional view on the line 3—3 of Fig. 1 showing the work head which is applicable to the work for checking surface finish;

Fig. 4 is a sectional view of the lower portion of the work head shown in gauging position on a workpiece;

Fig. 5 is an end view of the amplifying valve housing; and

Fig. 6 is a detail showing the relief valve guide.

Referring more particularly to the drawing in which the same reference numerals have been applied to the like parts in the several views, 10 generally designates the frame of a flow gauging means adapted for connection through conduit 11 and an automatic pressure regulator 12 to a source of fluid under pressure. The factory air line may be used as a source, the pressure regulator 12 supplying air under controlled pressure through the conduit or pipe 11 to the lower side of a tapered flow tube 13 having an indicator or float 14. The passage through the tube 13 increases in size as the tube extends upwardly so the height of the float 14 indicates the rate of flow through the tube. The upper end of the tube is connected to a coupling 15, see Fig. 2, adjacent the lower end of the housing 10. The flow path from the factory air line connection to the coupling 15 may correspond to the arrangement described in U. S. Patent 2,254,259, although it should be understood that the flow gauging means may be of any suitable character.

Mounted on the coupling 15 is a valve housing 17 having valving which greatly amplifies the change in the rate of fluid flow through the coupling 15 as changes take place in the flow through the connection 18. The connection 18 may lead to any suitable gauging nozzle or nozzles the flow through which is to be gauged and insofar as concerns the valving arrangement about to be described, it is to be understood that the invention is not limited to the checking of surface finish nor to the particular details of the valve itself. In the particular form of the invention illustrated however, the connection 18 is connected to a flexible conduit 19 leading to a tubular connection 20 on a work head 21 which will be presently described.

The valve housing 17 is provided with an inlet passage 23 in communication with a passage 24 having branch passages 25 and 26, passage 26 communicating with a pressure chamber 27. A cylindrical passage 28 in the housing 17 forms an annular wall partially defining the pressure chamber 27, and a piston 29 slidable in the passage 28 forms a movable upper wall of the pressure chamber. The lower wall of the pressure chamber is formed by the plug 30 threaded in the threaded passage 31 in the housing. A sealing washer 32 prevents loss of fluid past the threaded connection. The plug 30 has a central passage 31' leading to the connection 18, through which fluid coming to the pressure chamber from branch passage 26 is conducted. The upper end of the plug 30 has crossed slots, as shown at 33, so that the piston 29 cannot entirely close communication between the passage 26 and the open upper end of the passage 31'.

Adjustable valves 35 and 36, controlled by adjusting knobs 37 and 38 respectively, permit adjustment in the amount of fluid that may flow through the two branch passages, permitting a complete closure of the branch passage 25, as shown in Fig. 2.

The upper end of the piston 29 engages the base of a valve stem 39 which is slidably operable in a guide 40 shown in Fig. 6. At its upper end the valve guide 40 has a boss 41 provided with transverse slots 42 which permits the flow of fluid at all times from the inlet passage 23 to the passage 24. The upper end of this boss engages a retaining plug 43 threaded in the top of the valve housing with a sealing washer 44 interposed between the head of the plug and the valve housing to seal against fluid leakage. A bored passage in the plug loosely receives the upper end of the valve stem 39 when the valve is moved upwardly from the retracted position shown in Fig. 2. A spring 45 is interposed between the lower end of the valve guide 40 and the upper end of the piston 29 to urge the piston yieldingly in a downward direction so that with no flow of fluid taking place the lower end of the piston contacts the upper slotted end of the plug 30.

When fluid is supplied under pressure to the pressure chamber 27, the pressure exerted on the lower end of the piston causes the piston to move upwardly thus moving the valve 39 upwardly and opening communication from the inlet passage 23 through an annular valve passage 46 to branch passages 47 in the valve guide 40. These branch passages 47 are in constant communication with a relief passage 48 extending to the atmosphere as shown in Fig. 5. Thus the greater the pressure existing in the pressure chamber 27, the more the valve 39 will be raised and the greater will be the flow that by-passes from the inlet 23 to the relief passage 48.

The operation of the automatic valve is as follows: With the fluid connection 18 extending to a gauging nozzle and with fluid under pressure supplied to the pressure regulator 12, valve 35 being retracted to open the passage to the branch passage 25, all of the flow through the flow tube 13 coming to the coupling 15 travels out through the passage 31' and the height of the float 14 indicates the amount of flow taking place through the passage 31'. None of the air entering the intake passage 23 is by-passed to the discharge passage 48 under these conditions, since the valve 39 remains in its lowered position, entirely cutting out flow from the intake 23 to the relief passage 48. The valve remains lowered because the pressure on the upper side of the piston 29 is the same as the pressure applied to the lower side of the piston, or substantially so. However, where an increased movement of the float is desired, or in other words, to increase the amplification factor of the flow gauge, the valve 35 is moved to close the branch passage 25 and the pressure exerted on the lower side of the piston raises the piston against the force of the spring 45 and moves the valve upwardly so that some of the air is relieved from the inlet 23 through valve passage 46 directly to the atmospheric vent passage 48. A slight increase in the pressure existing in the pressure chamber 27, produced by a decrease in the flow through connection 18 for example, raises the piston and the valve to increase the rate of flow through the discharge passage 48 so that small changes in the rate of flow through the connection 18 have a much greater effect in the rate of flow of fluid through the coupling 15 and through the flow gauge. A small increase in the flow taking place through connection 18 and the resulting decrease in pressure below the piston causes a comparatively large downward movement of the float 14.

By changing the setting of the valve 36 the level of the float may be changed to bring it within the proper range of the flow tube for any given condition.

By reason of the pressure responsive valve which controls the flow of fluid to the atmosphere and to the gauging nozzle in an automatic manner, wide variations in the rate of flow through the flow gauging device can be caused by comparatively small variations in the flow through the gauging nozzle, thus greatly amplifying the sensitivity of the gauging instrument. It should also be noted that it is not necessary to have the fluid pressure supply for the pressure chamber come from the same pressure regulated system in which the flow gauging means is contained. However in the particular embodiment of the invention illustrated the coupling 15 and the inlet passage 23, flow through which is controlled by the pressure responsive valve 39 also, constitute the source of fluid supply at substantially constant pressure for the operation of the valve 39.

In the particular embodiment of the invention shown, where the device is for checking surface finish, the fluid connection 18 as previously mentioned is connected to a gauge head 21 on which is cemented a ring or pad 50 of rubber or other suitable yielding material, and cemented or fixed to the pad 50 is a thin flexible centrally perforated disc or ring 51, preferably of steel of a few thousandths of an inch in thickness so that when it is applied to the workpiece it will conform to the general contour or general waves in the face of the workpiece. However, the smooth finished surface on the side of the ring 51 that is applied to the workpiece, being of hard material, will form tiny passages between the gauging surface and the surface to be gauged, so that the roughness of the surface gauged will control the amount of fluid escaping.

The work head 21 has a flange 52 normally carried against an inturned flange 53 in a sleeve 54, there being sufficient clearance between the outer surface of flange 52 and the inner diameter of sleeve 54 so that some angular movement or tilting of the work head 21 can take place within the sleeve. Within the sleeve is an abutment ring 55 held up against a locating screw 56 by a tension spring 57. The lower end of the spring 57 urges the work head 21 downwardly holding it normally against the flange 53 in the position shown in Fig. 3. Slidably arranged on the outside of sleeve 54 is a guard sleeve 58 normally held in a projected position as shown in Fig. 3 by a spring 59. A pair of stop screws 60 threaded in the guard sleeve 58 operate in longitudinally extending slots 61 in the sleeve 54. Spring 59 exerts only a light pressure on the guard sleeve so that when the lower end of the sleeve is applied to the work the sleeve is easily pushed upwardly permitting the application of the gauging surface to the surface to be gauged.

As the operator presses downwardly on the handle 62, which is fixed to the upper end of the sleeve 54, pressure is applied through the spring 57 to exert a predetermined constant pressure of the head 21 against the work, since the spring 57 is interposed between the handle and the work head. In its gauging position the flange 52 is spaced from the stop flange 53, as will be apparent from the position of the parts shown in Fig. 4. The tilting action of the work head within the guide sleeve 54 insures complete engagement of the gauging surface with the work even if the axis of the sleeves 54 and 58 may not be exactly perpendicular to the surface gauged.

The distance between the passage in the gauging sheet 51 and the circumference of that sheet and the pressure of the fluid supplied to the passage in the gauging head control the amount of fluid leakage taking place along the tiny cracks and crevices of the workpiece gauged, the pad 50 preventing loss of pressure as the fluid travels to the surface to be gauged. Since the sheet 51 is comparatively thin but of comparatively rigid material, it is flexible enough so that it will accommodate itself to any small changes in curvature of the surface gauged. With the device connected through a valve arrangement as shown in Fig. 2, so that an increased amplification of the flow gauge readings is obtained, extremely accurate readings of surface finish can be obtained by direct comparison with a master or surface of known micro finish.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging head adapted for use with a flow measuring device, for a gauging operation by fluid flow between a surface to be gauged for surface finish and a gauging surface, comprising a member having a fluid passage and having a discharge opening, a yielding pad secured to said member around the discharge opening and a thin flexible sheet of metal secured on said pad and having a smooth perforated gauging surface for application to the surface to be gauged.

2. In a device for gauging surface finish by fluid flow between the surface to be gauged and a gauging surface, a gauging head having a fluid supply passage, a thin flexible sheet of material having a passage therethrough and provided with a smooth gauging surface for application to the surface to be gauged, and a pad of yielding material secured at one side thereof to the gauging head adjacent the fluid supply passage and secured at the other side thereof to said sheet of material and forming an air conduit between said head and said sheet, said sheet being sufficiently thin to conform to the general contour of the surface gauged merely by application of manual pressure exerted through said pad.

3. In a device for gauging surface finish by fluid flow between the surface to be gauged and a gauging surface, a gauging head having a fluid supply passage, a thin flexible sheet of material having a passage therethrough and provided with a smooth gauging surface for application to the surface to be gauged, a pad of yielding material securing said sheet to said head and forming an air conduit between said head and said sheet, the thinness of the said sheet being such that it will conform to the general curvature of the surface gauged and a spring pressed guard means about said head for the protection of said sheet.

4. A gauging head adapted for use with a flow measuring device, for a gauging operation by fluid flow between the surface to be gauged and a gauging surface, comprising a member having a fluid passage and having a discharge opening, a rubber ring cemented to said member around the discharge opening and a thin metal disk cemented on said pad and having a smooth centrally perforated surface for application to the surface to be gauged, said disk having flexibility to conform to the general contour or curvature of the surface gauged.

5. In a device for gauging surface finish by fluid flow between the surface to be gauged and a gauging surface, a gauging head having a fluid supply passage, a thin flexible sheet of hard material having a passage therethrough and provided with a smooth perforated gauging surface for application to the surface to be gauged, a pad of yielding material securing said sheet to said head and forming an air conduit between said head and said sheet, and means for exerting a predetermined pressure on said gauging head.

6. A fluid operated gauging apparatus for gauging surface finish and adapted for connection to a fluid pressure source, comprising a flow gauge, means providing a controllable relief passage, a fluid connection from the flow gauge to the relief passage on the down stream side of the flow gauge, a work head having a fluid passage, means for supplying fluid under pressure to said fluid passage, a thin flexible apertured hard surfaced sheet adapted for application to a surface to be gauged for surface finish, a yielding pad having a central aperture and secured between said sheet and work head, the aperture in said pad and sheet communicating with the fluid passage in the work head, a valve operable to control flow through said relief passage and valve controlling means responsive to changes in fluid pressure in the work head passage for automatically controlling said valve such that small changes in fluid flow through the work head cause amplified changes in fluid flow to said relief passage.

7. A fluid operated gauging apparatus for gauging surface finish and adapted for connection to a fluid pressure source, comprising a flow gauge, means providing a controllable relief passage, a fluid connection from the flow gauge to the relief passage, a work head having a fluid passage, means for supplying fluid under pressure from the flow gauge to said fluid passage, a thin flexible hard surfaced sheet adapted for application to a surface to be gauged for surface finish, a yielding pad between said sheet and work head, said pad and sheet having passage in communication with the fluid passage in the work head, a handle, a spring between said handle and said work head for applying a predetermined force to said work head and valve means responsive to changes in fluid pressure in the work head passage for automatically controlling said relief passage and thus affect the flow gauge.

8. In a device of the character described, a flow gauging means adapted for connection to a source of regulated fluid pressure, said means having a member responsive to changes in fluid flow, a pressure chamber in communication with said gauging means and on the down stream side thereof and having a discharge opening for the discharge of fluid passing the gauging means, and a valve automatically operable in accordance with the pressure in the pressure chamber for controlling the flow of fluid from said pressure chamber through said discharge opening.

9. In a device of the character described, a flow gauging means adapted for connection to a controlled fluid pressure source and having a member responsive to changes in fluid flow, a gauging head having a passage and having a discharge opening, means for supplying fluid under pressure to said passage, means providing a relief passage for fluid passing said gauging means, and a valve automatically operable in accordance with changes in the pressure in said gauging head passage for controlling the flow of fluid from said gauging means to said relief passage.

10. In a device of the character described for increasing the sensitivity of a flow gauging means, a valve housing having a supply passage adapted for connection to a flow gauging means, a pressure chamber provided with a discharge opening, means for supplying said chamber with fluid under pressure, a valve automatically operable in accordance with the pressure in the pressure chamber, said housing having a relief passage controlled by said valve for controlling the flow of fluid from said supply passage.

11. A gauging device comprising a flow gauging means adapted for connection at the supply side thereof to a source of regulated pressure, means at the down stream side of said flow gauging means providing a discharge passage for the relief of fluid passing the gauging means, a relief valve operable to control the flow through said discharge passage, a gauging head having a passage for fluid passing to a gauging zone, means for supplying fluid under pressure to said gauging head passage, pressure sensitive means responsive to the changes in pressure in said gauging head passage, and a connection between said pressure sensitive means and said relief valve for automatically controlling said valve so that small changes in fluid flow in the gauging head passage produce amplified changes in the fluid flow through the flow gauging means.

12. A gauging device comprising a gauging head, a pressure regulator, a conduit for supplying fluid under controlled pressure from the pressure regulator to the gauging head, a flow restricting means between the gauging head and the pressure regulator and providing a pressure chamber between the flow restricting means and the gauging head, a pressure responsive element in communication with said pressure chamber and gauging means responsive to fluid flow and controlled by said element, said gauging means comprising a flow gauge having a discharge passage to the atmosphere, and flow controlling means controlled by said pressure responsive element to vary the rate of flow through said discharge passage.

GENE W. GRAY.

REFERENCES CITED

The following references are of record in the file of this patent:

UNITED STATES PATENTS

| Number | Name | Date |
| --- | --- | --- |
| 2,150,266 | Cotner | Mar. 14, 1939 |
| 2,375,600 | Wattebot | May 8, 1945 |
| 2,403,897 | Aller | July 16, 1946 |
| 2,417,988 | Mooney | Mar. 25, 1947 |
| 2,420,394 | Gilman | May 13, 1947 |

FOREIGN PATENTS

| Number | Country | Date |
| --- | --- | --- |
| 577,294 | Great Britain | May 13, 1946 |